July 15, 1958
A. DEVAUX ET AL
2,843,454
CONVERSION OF SODIUM CHLORIDE INTO SODIUM CARBONATE
AND AMMONIA CHLORIDE
Filed July 26, 1954
2 Sheets-Sheet 1
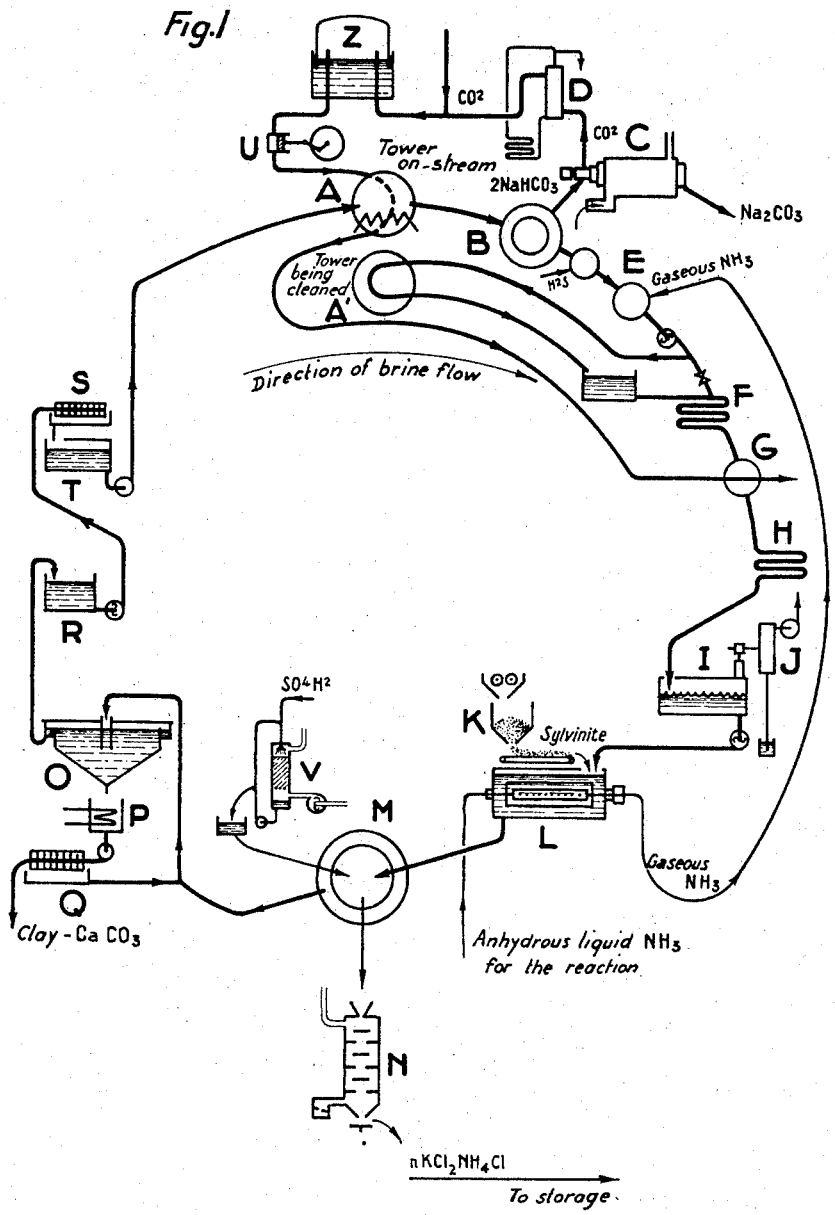

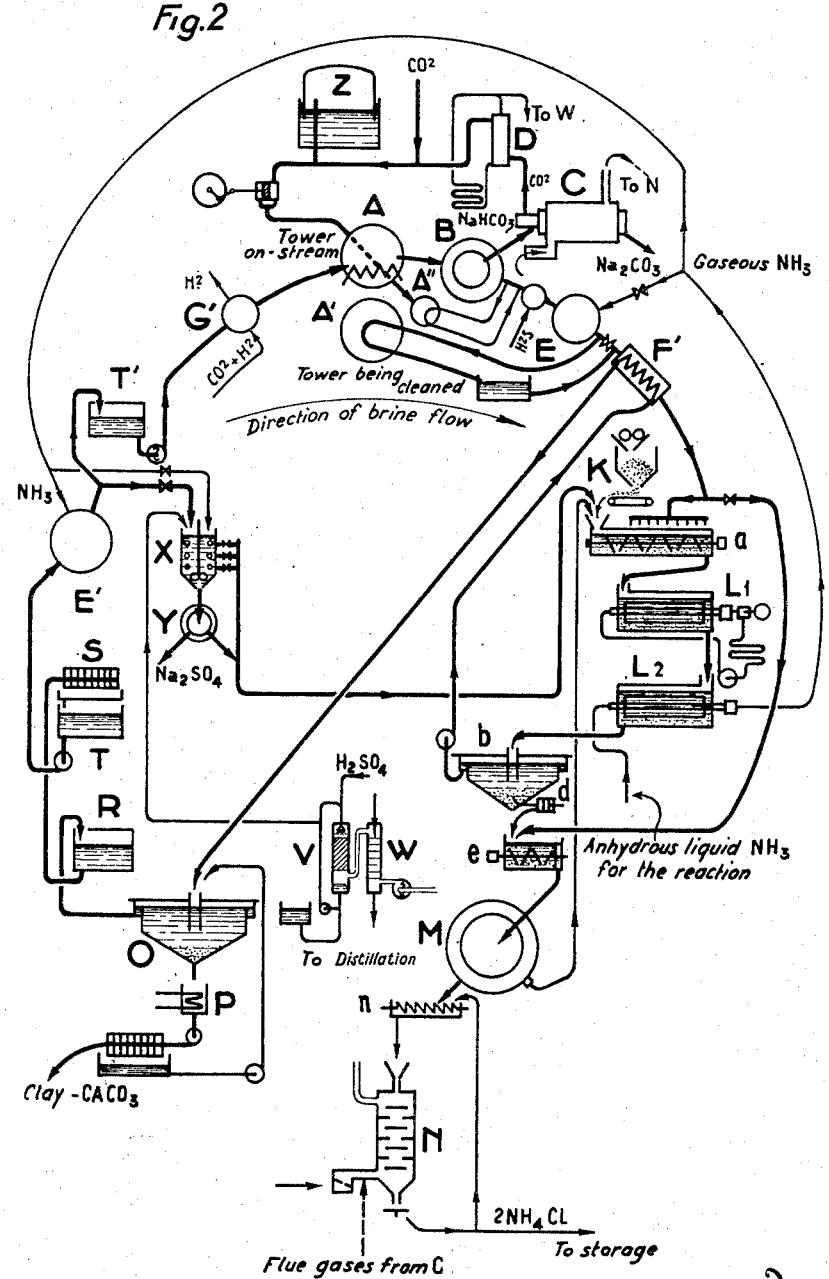

United States Patent Office 2,843,454
Patented July 15, 1958

2,843,454

CONVERSION OF SODIUM CHLORIDE INTO SODIUM CARBONATE AND AMMONIA CHLORIDE

Adrien Devaux, Douai, and Marcel Jean, Paris, France, assignors to Societe Chimique de la Grande Paroisse, Azote et Produits Chimiques, Paris, France Application July 26, 1954, Serial No. 445,568

Claims priority, application France April 5, 1954

2 Claims. (Cl. 23—63)

This invention relates to the conversion of sodium chloride into sodium carbonate and ammonium chloride according to the known Schreib and Georges Claude processes. It is concerned with improvements in the continuous cycle characteristic of these processes and is mainly directed to the application of said cycle to impure raw materials. Moreover, these improvements are also beneficial, however small the proportion of the impurities may be.

In order that the nature of the present invention may be better understood, it will be described with reference to the annexed drawings in which:

Figure 1 shows diagrammatically an example of the prior art continuous cycle to which the improvements of the present invention are applicable;

Figure 2 illustrates a system similar to that shown in Figure 1, but embodying the improvements of the present invention.

In these figures, the same elements or corresponding elements are designated by the same reference numerals, or by thse numerals with appropriate suffixes.

Referring to Figure 1: It illustrates a cyclic operation as applied to the processing of a raw material, sylvinite, substantially free of impurities. The process resorts to two well known reactions:

(1) For the precipitation of $NaHCO_3$, to the so-called Solvay reaction:

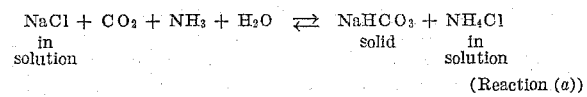

(Reaction (a))

(2) For the cold precipitation of $NH_4Cl$, to its insolubilization according to the reaction:

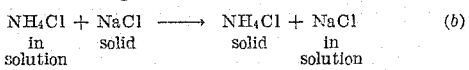

Precipitation of the $NH_4Cl$ is facilitated by the presence of other ammonia salts, of which $(NH_4)_2CO_3$ is the easiest to use in the case of reaction (b) when considered as a part of the whole process.

Referring to Figure 1 of the drawings: The cycle can be considered as beginning when the mother liquor leaves the bicarbonation tower A (carbonator) charged with solid $NaHCO_3$, which salt is then separated in the centrifuge B and calcined as usual in furnace C to produce sodium carbonate, and release $CO_2$, which is stored in gas holder Z for reuse in the process. The composition of this mother liquor is approximately as follows:

| | Gr./l. (litre) |
|---|---|
| $CO_2$ | 60 to 70 |
| $NH_3$ (alkaline) | 30 to 35 |
| $NH_4Cl$ | 170 |
| $NaCl$ | 90 to 95 |
| $K+$ in terms of $KCl$ | 66 |
| $SO_4^{--}$ | 23 to 25 |

Temperature—about 28 to 30° C.

The bicarbonate mother liquor is first sulphurized by a slight addition of waste gas rich in $H_2S$. This sulphurizing treatment inhibits apparatus corrosion and, moreover, makes it possible to obtain a sodium carbonate free of any trace of iron compounds. The mother liquor then receives at E a suitable amount of gaseous ammonia corresponding to the reaction of the cycle. A side stream of the ammoniacal solution is used for scouring the tower A' being washed, i. e. to dissolve deposits of $NaHCO_3$ therein.

Following cooling at F, an additional amount of $CO_2$ from gas holder Z is introduced at G, and raises the $CO_2$ content to 86–93 gr./l. for a $NH_3$ content of 70–75 gr./l. It is well known that a rise in the $(NH_4)_2CO_3$ content results in increased solubility of $NaCl$ and in decreased solubility of $NH_4Cl$, while an excess of $NH_3$ over the stoichiometric amount corresponding to $$(NH_4)_2CO_3$$

has an opposite and detrimental effect. However, it is not possible in actual practice to get this exact molecular ratio of $1CO_2$ for $2NH_3$, due to the hydrolysis of $(NH_4)_2CO_3$ into $NH_4HCO_3 + NH_4OH$. In the presence of highly concentrated $NaCl$, this hydrolysis results in a substantial precipitation of $NaHCO_3$, according to the equation:

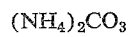

$$NaHCO_3 + NH_4Cl + NH_4OH$$

This precipitation would have started to take place if, in the solution containing 75 gr./l. of $NH_3$, there had been introduced $CO_2$ up to 97 gr./l. instead of 93 gr./l.; however, the presence of $(NH_4)_2CO_3$ raises the temperature at which the first crystals of $NH_4Cl$ is deposited to about 20–22° C.; it is therefore necessary to cool at H with lukewarm water only and to use a vacuum cooler at I.

The solution leaving I at about 10° C., and charged with $NH_4Cl$ crystals, is then charged with finely ground sylvinite supplied from K, up to 275 to 290 grams per litre. Energetic stirring in tank L, cooled by a rotating cylinder wherein is evaporated anhydrous liquid ammonia used in the cycle, facilitates solution of the $NaCl$ and completes precipitation of the ammonium chloride.

During this rather rapid conversion, anhydrite contained in sylvinite is only partly transformed, according to the equation:

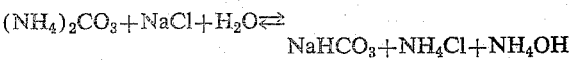

The cold slurry containing the solid product is sent to the centrifugal separator M; upon completion of the separation, the solid separated product is washed with a neutralized solution resulting from the washing at V with an acid solution of the ammonia-containing air removed at those parts of the plant where the odor of ammonia may be annoying. Due to the sulphate contained in this solution, a double decomposition takes place in the separated (centrifuged) mass:

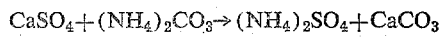
$$K_2SO_4(\text{or } \tfrac{1}{2}K_3Na(SO_4)_2) + 2NH_4Cl$$

The high percentage of potassium salts and the low solubility of the potassium sulphates limit the concentration in $SO_4^{--}$ ions to about 25–27 gr./l., so that their presence does not cause serious trouble.

The centrifuged product is stored after being dried in a vertical drier N. The liquid is sent to a Dorr decanter O from the bottom of which sludge is regularly removed, said sludge consisting essentially of clay, sylvinite and very fine $CaCO_3$, resulting from the double decomposition of the anhydrite.

The decanted brines, after passing through the surge or holding tank R, are filtered at S, pass through a storage tank T and are led to the carbonator A.

The substitution of an impure salt, heavily loaded with gypsum, for Alsatian Sylvinite, causes serious disturbances. Centrifuging of the very fine, crystallized $NH_4Cl$ is difficult due to the absence of KCl grains, the more so as the conversion of the gypsum increases in importance and results in a greater amount of $CaCO_3$ being formed at a low temperature, which is extremely fine and very difficult to centrifuge; on the other hand, the absence of K ions result in considerable increase of $SO_4^{--}$ ions (up to 65 gr./l.): substantial precipitation of $(NH_4)_2SO_4$, $Na_2SO_4 4H_2O$, or even of $Na_2SO_4 7H_2O$ in $NH_4Cl$ have been frequently observed; the presence of these hydrated salts renders drying more difficult and lowers the purity of the product; the presence of very fine $CaCO_3$ increases these drawbacks still more; during the drying, a double decomposition tends to liberate $NH_3$, which is lost, and to form hygroscopic $CaCl_2$, according to the equation:

$$CaCO_3 + 2NH_4Cl = CO_2 + 2NH_3 + H_2O + CaCl_2$$

The main object of this invention is to overcome the above-mentioned difficulties; other objects are to make the manufacture cheaper and easier to control; these objects are attained by the improvements disclosed hereinafter, which are simultaneously embodied in a plant, according to Figure 2, on which the same elements as in Figure 1, or the corresponding elements, are designated by the same reference numerals or by these numerals with suffixes.

These improvements concern more particularly the solution of the NaCl, crystallization, centrifuging and drying of the $NH_4Cl$, reduction of ammonia losses and its recovery, and elimination of sulphate deposits.

The improvements relate more particularly to the following features:

(1) Whereas sylvinite is relatively dry, coarse-grained and easy to grind, sodium chloride frequently has a 3 to 4% moisture content which renders the necessary, preliminary grinding difficult.

According to the invention, this difficulty is overcome by mixing with the unloaded (discharge) salt 2 to 3% anhydrous sodium carbonate; after storage for several hours or several days, the sodium carbonate is hydrated into a solid salt at the expense of the initial moisture of the NaCl, and the product may then be ground and screened without any difficulty; $Na_2CO_3$ mixed with NaCl does not cause any disturbance in the processing.

(2) Centrifuging of the ammonium chloride is facilitated by increasing the size of its crystals by the following method: instead of reacting the ground salt with the cold ammonium chloride solution all at once, there is introduced at one end of the tank a provided with stirring means (Fig. 2) brine almost saturated with NaCl from the centrifugal drier M, the ground salt from K is suspended therein, and the solution of $NH_4Cl$, substantially monocarbonated (i. e. containing $NH_4HCO_3$) proceeding from heat exchanger F' at a temperature of about 20° C. is distributed at multiple spaced points along the solution tank a in a plurality of regular, continuous streams. Cooling down to about +5 or +7° C. is continued in tanks $L_1$ and $L_2$ provided with rotary evaporators.

The $NH_4Cl$ crystals gradually formed and slowly increased in this manner are substantially larger and have a precipitation speed 3 to 5 times greater than those obtained by the prior process, and are more easily centrifuged and dried.

(3) To decrease to a minimum, in the product to be centrifuged, the amount of very fine $CaCO_3$ resulting from the cold double decomposition of the gypsum or the anhydrite contained as impurity in the NaCl, the stream of cold slurry leaving $L_2$ is sent in a predecanter b wherein, due to their increased decantation speed, the crystals of $NH_4Cl$ are separated from a turbid liquid which is passed, after being reheated in F', to a decanter O of large diameter. From the bottom of the predecanter b, the salt slurry containing about 3 to 5 times less turbid brine, is sent to a stirring tank e, then to the centrifuge M.

Since the amounts of $CaCO_3$ and clay going to the centrifuge have thus been greatly reduced, the obtained product is easier to centrifuge; it contains less ammoniacal mother liquor; there is no longer, during the drying, appreciable amount of double decomposition; ammonia losses are thereby lessened and the end product is much less hygroscopic. Further, the reduction in the volume of alkaline mother liquor flowing through the centrifuge results in a substantial reduction in loss of ammonia by aeration. Moreover, the time required for centrifuging the fertilizer is also substantially reduced. The same technique of predecanting applied to the bicarbonate slurry makes it also possible to reduce the number of centrifuges in use.

(4) Drying of the intensely cold product leaving the centrifuge is facilitated by mixing it at n with an appreciable fraction of recycled dried product; the mixture then enters drier N at a relatively high temperature of about 50 to 60° C., instead of 6 to 8° as in prior processes, so that the steam released during the drying does not tend to condense on the incoming product, as was the case when this product was introduced at too low a temperature.

Advantage may be taken of this mixing operation for partially neutralizing the alkalinity of the ammonium chloride by incorporating a fraction of the acid solution used for recovering ammonia.

(5) Drying of the $NH_4Cl$ is rendered more economical by using as the drying fluid the fumes, at relatively high temperatures, from the furnaces C used for calcining the bicarbonate.

(6) The nitrogen content of the product is improved by the following means:

When precipitating the $NH_4Cl$ to obtain a brine practically saturated with NaCl, and thereby assuring a maximum production of $Na_2CO_3$, the theoretical amount of NaCl is introduced in to the solution tank a. As solution takes place, the finer grains are dissolved first; when the solution is nearly saturated with NaCl, it is in contact with the larger grains, which are the slowest to dissolve. These large grains cannot in fact be dissolved, and their presence in the ammonium chloride lowers the nitrogen concentration of the fertilizer.

If, following separation in decanter b of the greater part of the saturated brine, a definite, fairly small amount of monocarbonated solution, rather low in NaCl, is introduced into the concentrated slurry at e, then, the dissolving power for NaCl is increased, so that the larger grains of NaCl can dissolve before the fertilizer is centrifuged.

With a contact time in e of 20 to 30 minutes, it has been found possible to lower systematically the NaCl content of the produced ammonium chloride from 7–8% to 2–3%. Brine leaving the centrifuge M is no longer fully saturated with NaCl but, since this bringe is recycled to tank a, no disadvantage results from this incomplete saturation. A further advantage of this procedure is that the NaCl is better utilized.

The ammonia losses are reduced by the following means:

(7) It is known that if the salt content of ammoniacal brines increases, there results a rapid rise in the vapor pressure of $NH_3$ and, consequently, an increase in the loss of this gas by aeration; but, as has been pointed out above, charging the solution with $(NH_4)_2CO_3$ has a favorable effect on the cold precipitation of $NH_4Cl$ and on the increased solubility of NaCl. If sylvinite be replaced by common salt, then, it has been observed that the absence of KCl in the brine causes a substantial increase in the content of soluble NaCl for a given temperature (generally between +5 and +15° C.). This observation has made possible a lower charge of $(NH_4)_2CO_3$ while maintaining, nevertheless, a sufficient concentration of NaCl in the brine to be supplied to the carbonator.

Accordingly, instead of incorporation at E in the bicarbonate mother liquor, the entire quantity of ammonia used in the process and effecting later the approximate monocarbonation at G (as in Fig. 1), there is introduced at E, according to the novel technique of the present invention, only that fraction of the ammonia which is barely greater than that corresponding to the neutralization of the $CO_2$ contained in the solution. Thus, to a bicarbonate mother liquor entering at E charged with 30 gr./l. of $NH_3$ and 56 gr./l. of $CO_2$, there is added only the amount of ammonia necessary for raising the contents to 46–47 gr./l. $NH_3$ (instead of 75 gr./l. as in the old process). As a result of this lowering of the $NH_3$ content, there is produced a very substantial reduction in ammonia losses, although the concentration of the brine in NaCl has been raised to 245–250 gr./l. The balance of ammonia must then be added before the bicarbonation.

(8) For similar reasons of economy, the vacuum evaporator assembly I—J (Fig. 1), which was a cause of losses, is replaced by a rotating, cooling cylinder wherein liquid ammonia is vaporized; this results in a substantial saving of steam and cooling water.

(9) The recovery of ammonia released by aeration, in the handling of the brines, is facilitated by a preliminary washing of the ammoniacal air from the aeration. According to the present invention, this preliminary washing is performed with water, the $NH_3$ content of which is continuously neutralized into $NH_4HCO_3$ by using said water as a washing liquid in scrubber D in which ascends the carbon dioxide released by the furnace C in which the bicarbonate is calcined. As is known, the vapor pressure of ammonia of bicarbonated solutions is practically nil. The bicarbonated water circulates along a partly closed circuit between D and W. A portion of this water is used for eliminating $NH_4Cl$ from the sodium bicarbonate when this product is washed in the centrifuge; another portion is distilled off and the resulting vapors cooled to about 60–62° C., from a substantially anhydrous gaseous mixture of $CO_2$ and $NH_3$ which is reintroduced into the mother liquor in the cycle (circuit).

(10) For analogous reasons, loss of ammonia at the top of the bicarbonation towers is practically eliminated—although the latter are supplied with the brine rich in free $NH_3$, or are simply monocarbonated with about 70 to 75 gr. $NH_3$/litre—by subjecting the outgoing residual gases to a systematic washing with bicarbonated mother liquor taken from the outlet of the bicarbonate centrifuge B, said washing taking place in tower A''.

In this connection, it should be mentioned that in plants associated with an ammonia synthesis plant, large quantities of $CO_2$-rich gas are generally available, containing but small amounts of neutral and, generally, reducing gases. As a result, the recovery of ammonia from the residual gases is much simpler than in Solvay plants in which the only available source of $CO_2$ is usually lime oven gas highly diluted with nitrogen. Large volumes of residual gases must then be washed in order to recover the ammonia contained therein.

(11) In a plant associated with an ammonia synthesis plant, there are available several abundant sources of carbon dioxide; on the one hand, from washing with water under pressure of the synthesis gases which generally contain appreciable quantities of H, and on the other hand, the $CO_2$ from the kilns which calcine the $NaHCO_3$ and which is generally contaminated with a small quantity of air. According to the invention, these two sources of $CO_2$ are used separately, which is advantageous not only from the standpoint of safety (the mixture, after elimination of the $CO_2$, being highly enriched with hydrogen and air), but also because it is possible to recover, economically, amounts of hydrogen which may represent from 3 to 4% of the volume used in the ammonia synthesis. Generally, these two sources of $CO_2$ are used in different bicarbonation columns; the reducing $CO_2$ can also be used in a monocarbonation absorber G'.

This monocarbonation heats the brine to the optimum temperature at which regularly granulated crystallized bicarbonate is obtained, which facilitates the centrifuging and washing thereof; as the reducing $CO_2$ often contains small amounts of $H_2S$, this performs at the same time the anti-corrosive sulphurization of the brines, as has been explained above.

(12) Ammonia losses are also reduced through the heating at F', by countercurrent heat exchange with the $NH_4Cl$ solutions monocarbonated at E, of the turbid liquids charged with clay and colloidal $CaCO_3$ from $b$, before they are introduced into decanter O.

Reduction of ammonia losses results from two factors:

($a$) the temperature rise causes the solution nitrogenous salts which may incidentally be carried along with the solution: fine particles of $NH^4Cl$ or seeds of the double sulphates $Na_2SO_4.(NH_4)_2SO_4.4H_2O$.

($b$) Prolonged residence of the colloidal $CaCO_3$ at the bottom of the decanter at 30° C. instead of 5 to 10° C., causes "ripening" of the same with formation of crystals which, though fine in size, are less difficult to filter than colloidal $CaCO_3$ formed at lower temeperature; the result is that the filtered sludges contain less retained (impregnating) mother liquor, which reduced the nitrogen losses.

Another advantage of this technique is that decantation is accelerated. As a result, it is much easier to obtain by passing through the filters S—which are then much less clogged—the perfectly clear liquid necessary for obtaining a pure sodium carbonate.

(13) According to the invention, the filtered sludges from O—if they contain substantial amounts of ammoniacal salts—are utilized by mixing them with about the same weight of superphosphate. In this way, instead of looking—as usual—like a plastic clay, they are transformed into a solid, powdered product which can be easily handled. The reason for this transformation is not quite clear; it seems to result from a very rapid formation of highly hydrated complex salts, which are crystallized and stable.

The new fertilizer thus obtained is a new industrial product claimed per se by the present invention.

(14) Finally, the invention obviates the clogging of tanks and pipes through the deposition, at certain cold points, of produced sulphates such as $Na_2SO_4.7H_2O$ or $(NH_4)_2SO_4.Na_2SO_4.4H_2O$. In this respect, the invention is based on the following observed fact:

Upon being closed down, it was found that tank T' (Fig. 2), which forms a reservoir for the ammoniacal brines, was charged with a salt which analysis showed to be substantially pure anhydrous sodium sulphate. The formation of this anhydrous salt is due to the dehydrating action of ammonia and to the reduced solubility of $Na_2SO_4$ caused by the alkalizing at E' of the NaCl-rich brine.

This observation made it possible to clear the solution of the detrimental portion of $SO_4$ ions by introducing into tank X a fraction of the alkalized brine, as well as the neutralized $(NH_4)_2SO_4$ solution resulting from the recovery of the aeration ammonia (it has already been mentioned above that the preliminary washing with bicarbonated water at W has made it possible to reduce the sulphuric acid scrubbing); the solution is stirred and, if necessary, a certain amount of ground NaCl is incorporated therein, substantially corresponding to the amount of $(NH_4)_2SO_4$ introduced; eventually, some ammonia is added, not exceeding about 90 gr./l., and the mixture is cooled down to room temperature while stirring. Following decantation, the clear brine is passed on to tank $a$ and the separated anhydrous sulphate is centrifuged. Only a small fraction of the circulating solution, sufficient to eliminate an amount of $SO_4$ ions equal to the one resulting from the transformation of the gypsum or the anhydrite of the raw material, need be introduced into tank X.

It will be obvious to the man skilled in the art, that the improvements and apparatus described above as applicable to the invention, are also applicable to the conversion of sodium chloride contained in the sylvinite into ammonium chloride for obtaining directly a binary fertilizer $K_2O+N_2$ (the so-called Potazote), of great value in agriculture, and the simultaneous conversion of the Na ion of this salt into $Na_2CO_3$ salt. The fertilizer value of the potash may also be increased not only by the addition of $NH_4Cl$, but also by the elimination of the NaCl, which is harmful to vegetation when present in appreciable quantities.

We claim:

1. Improvement in the cyclic process of producing sodium carbonate and ammonium chloride, wherein an impure sodium chloride containing $SO_4$ ions is reacted with $CO_2$ and $NH_3$ to form a precipitate of sodium bicarbonate and a mother liquor comprising ammonium chloride and carbon dioxide in solution, the sodium bicarbonate is separated and calcined to produce sodium carbonate and $CO_2$, while the mother liquor is treated with solid sodium chloride to precipitate ammonium chloride and form a brine for reuse in the cycle, comprising the steps of: adding to the mother liquor substantially an amount of ammonia required to saturate the free carbon dioxide contained in the liquor; adding ammonia to a portion of the brine solution to form anhydrous sodium sulphate; cooling the resultant solution mixture and removing therefrom the sodium sulphate in solid state; and recycling the remaining liquid to the earlier stage in the process where the solid sodium chloride is treated with the mother liquor.

2. Improvement in the cyclic process of producing sodium carbonate and ammonium chloride, wherein an impure sodium chloride containing $SO_4$ ions is reacted with $CO_2$ and $NH_3$ to form a precipitate of sodium bicarbonate and a mother liquor comprising ammonium chloride in solution, the sodium bicarbonate is separated and calcined to produce sodium carbonate and $CO_2$, while the mother liquor is treated with solid sodium chloride to precipitate ammonium chloride and form a brine for reuse in the cycle, and wherein ventilation of the system produces ammonia-containing air, the improvement of advantageously recovering said ammonia comprising: scrubbing with water the $CO_2$ produced by the calcination of the sodium bicarbonate; using the charged scrubbing liquor to preliminarily wash the ammonia-containing air; recycling the wash liquor to said scrubbing step, and further treating the washed air with acid to recover the remaining ammonia therefrom; adding to a minor fraction of the brine a portion of said wash liquor; adding ammonia to the resultant mixture to form anhydrous sodium sulphate; cooling the resultant solution mixture; removing the sodium sulphate in solid state; and recycling the remaining liquid to an earlier stage in the system where the solid sodium chloride is dissolved.

References Cited in the file of this patent

UNITED STATES PATENTS

| | | |
|---|---|---|
| 286,132 | Harned | Oct. 2, 1883 |
| 318,044 | Semper | May 19, 1885 |
| 495,323 | Froehling | Apr. 11, 1893 |
| 902,403 | Holloway | Oct. 27, 1908 |
| 1,488,002 | Claude | Mar. 25, 1924 |
| 1,491,672 | Claude | Apr. 22, 1924 |
| 1,951,489 | Remy-Neris | Mar. 20, 1934 |
| 2,024,679 | Cunningham | Dec. 17, 1935 |
| 2,161,711 | Keep et al. | June 6, 1939 |
| 2,622,004 | Miller et al. | Dec. 16, 1952 |
| 2,693,403 | Brumbaugh et al. | Nov. 2, 1954 |
| 2,739,044 | Ashley et al. | Mar. 20, 1956 |

FOREIGN PATENTS

| | | |
|---|---|---|
| 462,132 | Great Britain | Aug. 26, 1936 |

UNITED STATES PATENT OFFICE

CERTIFICATE OF CORRECTION

Patent No. 2,843,454                         July 15, 1958

Adrien Devaux et al.

It is hereby certified that error appears in the printed specification of the above numbered patent requiring correction and that the said Letters Patent should read as corrected below.

Column 1, line 36, for "thse" read -- these --; column 4, line 56, for "bringe" read -- brine --; column 6, line 18, for "$NH^4Cl$" read -- $NH_4Cl$ --.

Signed and sealed this 7th day of October 1958.

(SEAL)
Attest:

KARL H. AXLINE
Attesting Officer

ROBERT C. WATSON
Commissioner of Patents